Nov. 8, 1960   B. VOUMARD ET AL   2,958,898
METHOD FOR THE MANUFACTURE OF A COLLAPSIBLE
TUBE AND MACHINE FOR CARRYING IT OUT
Filed Feb. 12, 1959   4 Sheets-Sheet 1

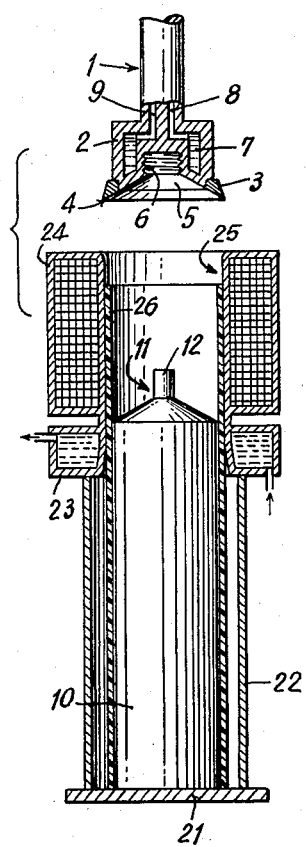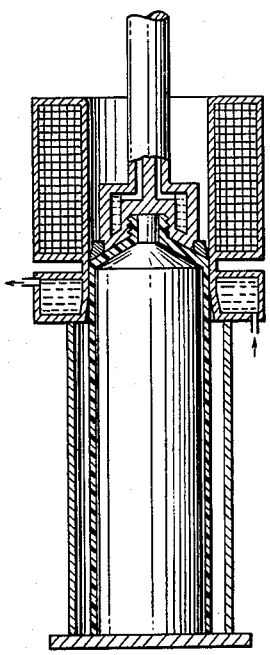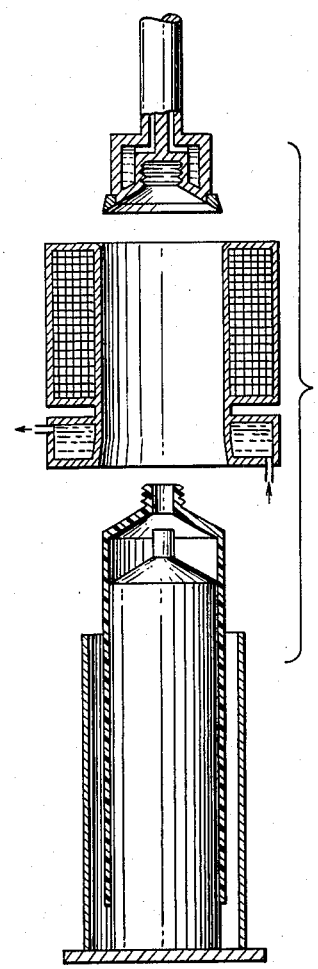

Nov. 8, 1960  B. VOUMARD ET AL  2,958,898
METHOD FOR THE MANUFACTURE OF A COLLAPSIBLE
TUBE AND MACHINE FOR CARRYING IT OUT
Filed Feb. 12, 1959  4 Sheets-Sheet 4
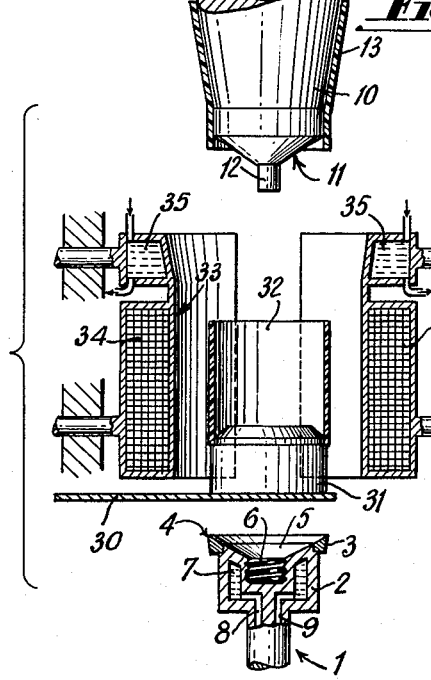
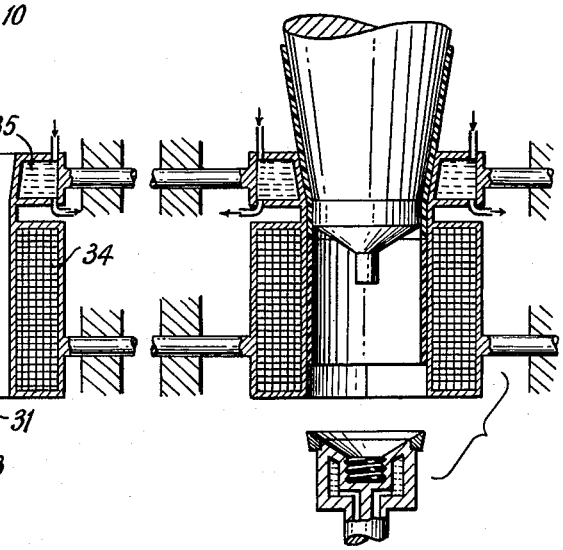
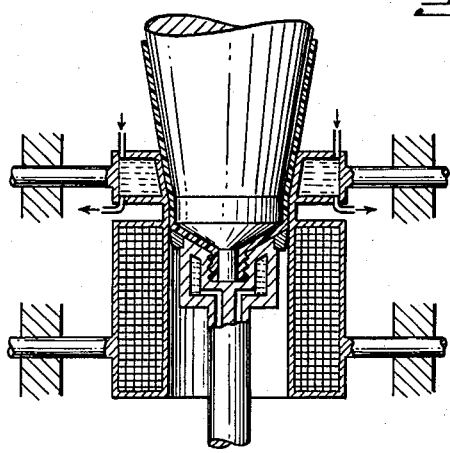
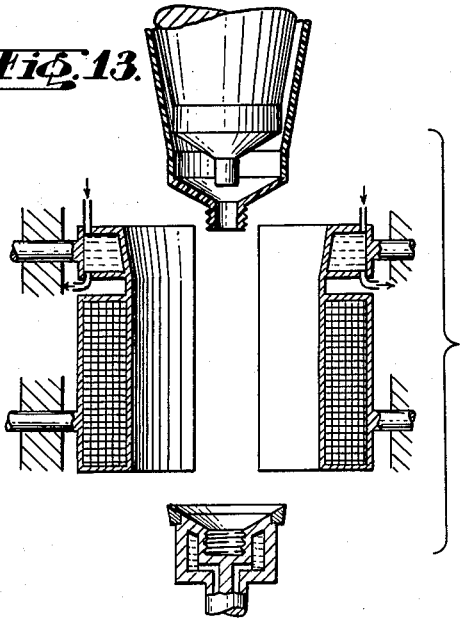

United States Patent Office 2,958,898
Patented Nov. 8, 1960

2,958,898
METHOD FOR THE MANUFACTURE OF A COLLAPSIBLE TUBE AND MACHINE FOR CARRYING IT OUT

Bertrand Voumard, 151 Rue du Parc, and Paul Monnier, 38 Rue des Recretes, both of La Chaux-de-Fonds, Switzerland Filed Feb. 12, 1959, Ser. No. 792,780

9 Claims. (Cl. 18—5)

The object of the present invention is a method for the manufacture, starting from a prefabricated tubular blank, of a collapsible tube of plastic material formed in one piece and comprising a tubular body and a head destined to receive a closing member. This method is characterized in that the material of a part of the blank is softened by heating it in contact with the wall of a chamber, in order to ensure that owing to adherence to this wall the blank is maintained in its initial shape, and in that the material which thus adheres is scraped off and that the head of the tube is formed with it by die-moulding Also an object of the invention is a machine for carrying out this method, comprising a core forming at one of its extremities a punch destined to cooperate with a part of the tubular blank, and a moulding die arranged to cooperate with the said extremity of the punch in order to form the head of the tube by die-moulding the material forming the blank, the punch and the die being capable of relative axial movement, and a chamber the wall of which closely surrounds the blank, at least during the die-moulding operation.

The purpose of the invention is to obtain a method in which the softened material is displaced from the exterior towards the axis of the blank in order to allow the evacuation of the air, for instance through ducts provided in the die, and thus to avoid the formation of bubbles. It also aims at obtaining a machine only requiring simple and cheap tools and allowing tubes to be produced at a very high rate owing to its simplicity and to the possibility of working with relatively simple multiple tools.

The machine constituting the object of the present invention is characterized in that it comprises means for heating the wall of the abovementioned chamber at least when it is in contact with the blank, in order to simultaneously soften the material of this blank and cause it to adhere to the said wall, and in that the die is provided with a peripheral edge forming a scraper, in order to scrape off the softened material adhering to the said wall and bring it gradually to cover the extremity of the punch, in the course of the relative motion between the die and this wall, just before and during the die-moulding operation.

The drawing illustrates, by way of examples, six embodiments of the machine according to the invention.

Figures 1 and 2, 3 and 4, and 5 to 7 are partial sections of the first, second and third embodiments, respectively, showing the die and punch in different relative positions.

Figures 10 to 13 are partial sections of the sixth embodiment showing the die and punch in different relative positions.

Figure 1:
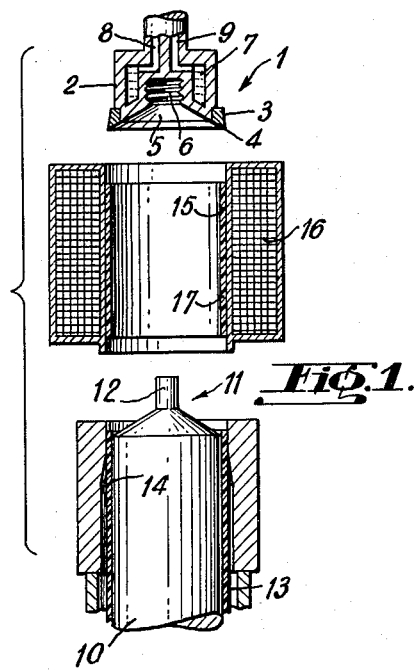
Figure 2:
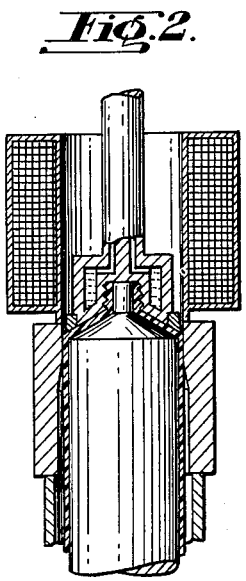

In the first embodiment illustrated in Figures 1 and 2, the machine comprises a die 1 having a cylindrical body 2 at the lower extremity of which is mounted an annular scraper 3 provided with a sharp peripheral edge 4 projecting obliquely downwards and outwards at the lower end of the die and beyond the exterior profile of the body 2. This scraper can be made of plastic material or of metal and has a shape giving a certain elasticity, in order that in all circumstances it may fit perfectly within the inner wall of a chamber with which it is destined to cooperate, as will be seen further on. The die 1 is hollowed out internally according to the shape to be given to the corresponding part of the tube to be made. The lower part of this hollow 5 is conical and terminates, inside the body 2 in a cylindrical part 6 provided with a helical thread destined to form on the tube a screw thread apt to receive a closing member. The die is provided with an annular inner chamber 7 for the circulation of a cooling fluid (in order to maintain the temperature of the die below the softening temperature of the plastic material of the blank), arriving through a duct 8 and escaping through a duct 9 both of which are formed in the die 1. The latter is capable of being axially displaced between an upper position shown in Figure 1 and a lower position shown in Figure 2.

The machine also comprises a core 10 having a cylindrical part terminating at its upper end in a punch 11 comprising a conical part corresponding to the conical hollow of the die 1 and a cylindrical part 12 destined to form the opening of the tube. It is obvious that the diameter of the cylindrical part 12 is less than that of the part 6 of the die, so as to give to the screw thread of the finished tube a sufficient thickness.

The core 10 carries a tubular body 13 destined to form a part of the tube to be made. The core 10 and the body 13 are mounted in a chamber 14 the upper part of which has an internal dimension corresponding to the external dimension of the body 13 in order that the latter may be mounted in the chamber 14. The machine comprises a chamber 15 formed by a hollow member 16 within which is contained a conducting winding enabling the heating of a second tubular body 17 closely fitted in the chamber 15. The heating could also be effected by means of a circulating fluid brought to the required temperature. The tubular bodies 13 and 17 constitute a blank in two parts of the tube to be made. They have the same peripheric dimensions and can be joined together in an exact manner.

Starting from the positions shown in Figure 1, the die 1 sinks and the chamber 14 and the core 10 rise to reach the positions shown in Figure 2, the tubular body 17 having been previously heated in the chamber 15. The circular edge 4 of the scraper 3, whose dimension slightly exceeds that of the chamber 15, is forced elastically into the latter and turns down the material constituting the tubular body 17 and progressively brings it to cover up the end of the punch 11. The material takes the desired shape owing to the cooperation of the die and of the punch so as to form the conical head of the tube and the threaded neck. During this operation, the plastic material is injected in a circular manner from the shoulder formed by the conical part of the punch 11, which allows the evacuation of the air to take place in the upward direction, which make it impossible for any air bubbles to be formed in the moulded plastic material. Narrow ducts (which are not shown) are provided in the body 2 to allow the escape of the air thus evacuated during the die-moulding operation. The tubular body 13 can be gripped very tightly within the wall of the chamber 14. It is no longer necessary, as in the known apparatus, to provide air passages at the level of the conical part of the punch. The bodies 13 and 17 are welded together when the die and the punch cooperate as described. The die and the punch then return to the position shown in Figure 1 and the finished tube can be withdrawn. In this embodiment the die 1 rotates around its axis as it rises after the formation of the tube, in order to become separated from the screw thread formed on the latter without damaging it.

Figure 3:
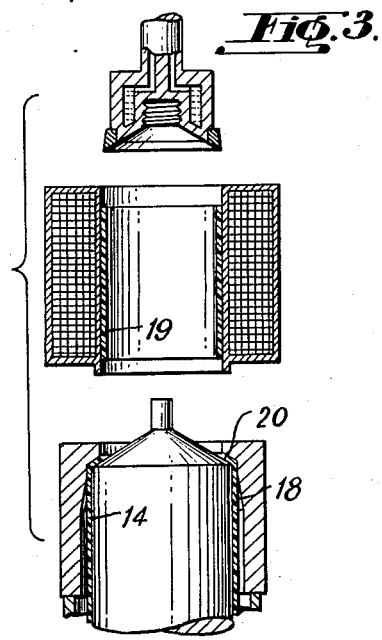
Figure 4:
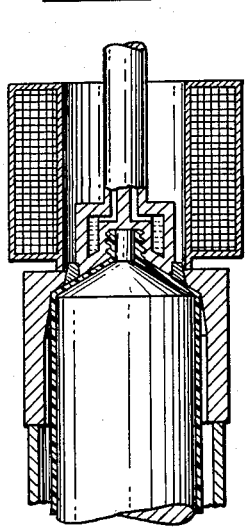

In the second embodiment illustrated in the Figures 3 and 4, the machine is arranged in the same manner as in the previous embodiment, but is destined to be utilized with a blank formed of tubular bodies 18 and 19 having different diameters. The body 18 terminates at its upper end by a conical or rounded off part 20 formed when the tube 18 is forced into place in the chamber 14. This body has an opening the dimension of which is similar to the peripheric dimension of the body 19. This latter, heated by the chamber surrounding it, is welded to the edge of the said opening and assumes the shape imposed by the punch.

In the two embodiments described no provision is made for cooling the extreme end of the tubular body destined to be welded to the blank. The die 1, the punch 11 and the chamber 15 all have the same vertical axis in common.

In the third embodiment illustrated in Figures 5 to 7, the machine comprises the same die as the one described in the previous embodiments, also arranged at the upper part of the machine. The latter also comprises a cylindrical core 10 terminating in a punch 11 the conical part of which corresponds to the conical hollow of the die, and the cylindrical part 12 of which is destined to form the opening of the tube. The core 10 rests on a base 21 which also supports a tube 22. The machine comprises a member constituted by a lower annular part 23 and an upper annular part 24. The parts 23 and 24 constitute a cylindrical chamber 25 in which the punch 11 engages. The die 1, the punch 11 and the chamber 25 have a common vertical axis. The diameter of the chamber 25 is greater than that of the core 10 in order that the latter may take a cylindrical one-piece blank 26 of plastic material destined to form the tube. This blank has a sliding fit on the core 10. The interior diameter of the parts 23 and 24 is very slightly less than the outer diameter of the blank 26 so that the latter is gripped between the inner wall of the parts and the core 10. The length of the blank 26 is greater than that of the core 10. The part 23 is at the same level as the upper end of the main cylindrical part of the core 10, whilst the part 24 is at the level of the part of the blank which extends beyond the punch 11. The part 23 is provided with a fluid circulation destined to maintain the part of the blank 26 in contact with this part at a temperature which is below the softening temperature of the material constituting the blank. The part 24 is destined to heat the material constituting the blank to bring it to the softening temperature. This part comprises for instance a conducting winding destined to be heated by an electric current.

The base 21 supporting the punch 10 is capable of moving between an upper position (Figures 5 and 6) and a lower position (Figure 7). The core 10 moves with this base, whilst the parts 23 and 24 remain immovable. The tube 22, in the upper position of the base 21, comes into contact with the part 23.

At the beginning of the cycle (Figure 5), the die 1 and the core 10 are both in their upper position. The blank 26 of plastic material is placed in the chamber 25 and on the core 10. A liquid flows in the part 23, whilst an electric current is sent through the winding of the part 24. The blank 26 is thus heated at its upper end which extends beyond the punch 11, the lower part of the blank remaining at a temperature which is below that at which the plastic material softens owing to the cooling effect exercised by the part 23. The softened part of the blank becomes adhesive and adheres to the wall of the chamber 25. When the upper part of the blank has been brought to the softening temperature, the die 1 moves downwards, scraping the plastic material off the wall, and comes to cooperate with the punch 11 (Figure 6) as described in the case of the first embodiment. Once the tube has been formed, the base 21 is lowered as well as the die 1 in order to expel the tube formed in the chamber 25. The die then returns to its upper position whilst turning around its axis as has been seen previously. The base 21 continues to move downwards to its lower position (Figure 7). The finished tube may then be removed from the core 10 and the cycle can begin again.

Figure 8:
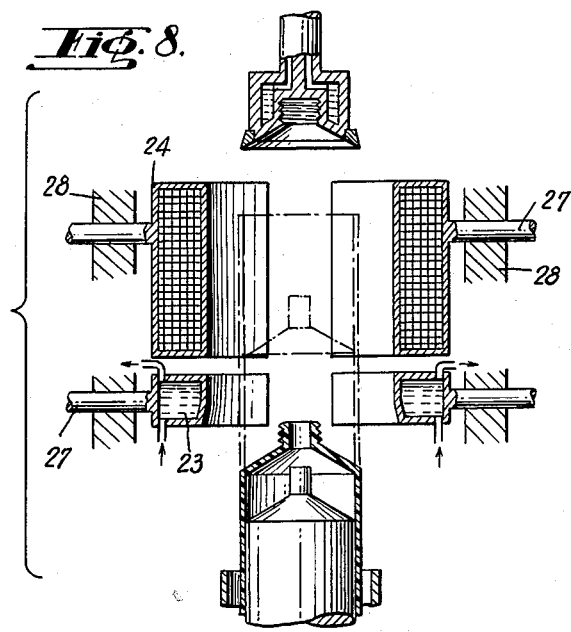
Figures 8 and 9 are partial sections of the fourth and fifth embodiments, respectively.

In the fourth embodiment shown in Figure 8, the two separate parts 23 and 24 are each constituted by two semicircular members secured to rods 27 capable of sliding in a part 28 of the frame of the machine so as to be able to move apart radially away from the axis of the blank. This arrangement enables the blank to be placed with ease on the core 10, the two members of each part 23 or 24 being in the moved apart position as shown in Figure 8, and then to grip this blank by moving the two members of these parts towards one another. The removal of the tube may also be facilitated in the same manner.

Figure 9:
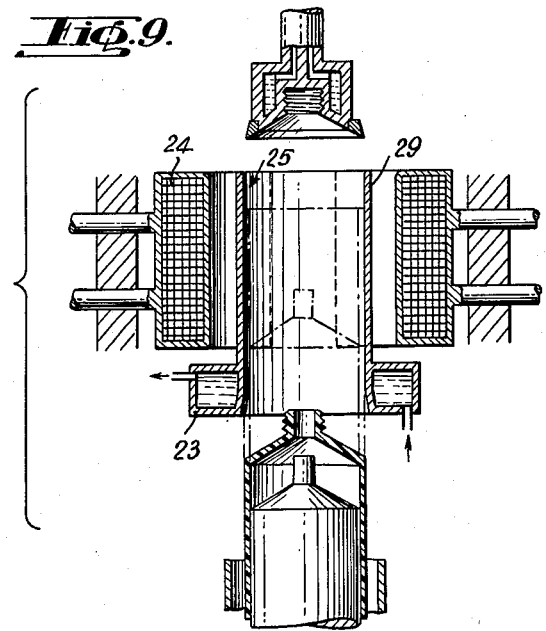

In the fifth embodiment shown in Figure 9, the part 23 is provided with a cylindrical portion 29 which constitutes the chamber 25. The part 24 is formed by two members capable of moving apart as shown, or of moving towards one another in order to closely surround the cylindrical portion 29 of the part 23.

In the sixth embodiment shown in Figures 10 to 13, the machine comprises a die 1 situated in the lower part and a core 10, the main body of which is a truncated cone in its upper part. This core 10, as in the previous embodiments, terminates in a punch 11 comprising a conical part and a cylindrical part 12.

The core 10 is carried by a member which has not been shown and supports a tubular body 13 destined to form a part of the tube to be made. The machine comprises a support 30 carrying a boss 31 on which is placed a second tubular body 32 which together with the body 13 constitutes the blank destined to form the tube. It also comprises a chamber 33 the wall of which is capable of closely surrounding the body 32. The chamber 33 is constituted by two blocks each comprising two hollow elements 34 and 35, each block being mounted in the manner indicated in the last two embodiments previously described to slide in the frame of the machine. The die 1, the punch 11 and the chamber 33 have the same vertical axis in common. The elements 34 are destined to effect the heating of the material constituting the tubular body 32 to the softening temperature. They are constituted by a conducting winding destined to be heated by an electric current. This heating effect could be obtained by means of a fluid brought to the required temperature. The elements 35 are destined for the circulation of a cooling fluid which has to maintain that part of the tubular body 13 which is in contact with these elements 35 at a temperature which is less than the softening temperature of the material which constitutes it. The intermediate zone between the cooled elements 35 and the heated elements 34 is in the immediate vicinity of the shoulder of the core 10 when the punch is in its lower position (Figure 11) as will be seen further on.

In the embodiment illustrated, the support of the punch 11 is capable of moving between an upper position (Figures 10 and 13) and a lower position (Figures 11 and 12). The core 10 moves with the support, whilst the elements 34 and 35 remain axially in a fixed position.

At the beginning of the cycle (Figure 10) the die 1 is in its lower position and the core 10 is in its upper position. The tubular body 13 of plastic material is placed on the core 10 and the tubular body 32 of plastic material is placed on the boss 31, the blocks each constituted by an element 34 and an element 35 being in the open position (Figure 10). The core 10 is then lowered, whilst the two blocks formed by the elements 34 and 35 move towards one another until they come into contact with one another and closely grip the tubular body 32 between them. The support 30 is lowered with the boss 31 and is withdrawn. The die 1 begins to rise (Figure 11). The tubular bodies 13 and 32 are such that they are joined exactly along the whole length of their periphery. A liquid circulates within the elements 35, whilst an electric current is sent through the winding of the elements 34. The tubular body 32 is thus heated, whilst the body 13 remains at a temperature which is less than the softening temperature of the plastic material owing to the cooling effect exercised by the elements 35. The softened tubular body 32 becomes sticky and adheres to the wall of the chamber 33. When the blank has been brought to the softening temperature, the die 1 rises to cooperate with the punch 11 (Figure 12). The circular edge 4 of the scraper 3, the dimension of which is slightly more than that of the chamber 17, is forced elastically into the latter, pushes back in the upward direction the material constituting the blank and causes it to cover progressively the extremity of the punch 11. The material assumes the desired shape owing to the cooperation of the die and punch to form the conical head of the tube and the threaded neck, as has been seen previously.

Once the tube has been formed, the core 10 rises and the die 1 moves down meanwhile rotating around its axis, whilst the blocks formed by the elements 34 and 35 move away from one another (Figure 13). In order to facilitate the cooling effect in the zone of the shoulder immediately after the formation of the head of the tube, it is possible to lift the die and the core 10 slightly so as to bring the shoulder of the tube into contact with the inner, completely cooled wall of the elements 35 and then to provide for a slight pause in this position so as to allow the cooling and stabilization of the tube of plastic material before it is evacuated. The formed tube can then be removed from the core 10 and the cycle can begin again. The tubular body 32, made of the same material as the tubular body 13, may be of another color.

The described machine allows the manufacture of the tubes according to a method only requiring a very short heating period, the whole of the material forming the head of the tube being heated simultaneously and very evenly by contact. Owing to this method, the head of the blank (the wall of which is generally very thin) keeps its primitive shape during the heating, adheres to the metal when heated and does not sag. The distribution of the material remains absolutely even during the whole die-moulding operation. The material is displaced from the outside towards the axis of the blank, thus allowing the evacuation of the air and avoiding the formation of bubbles. A supplementary adjunction of material to form the head of the tube is no longer necessary. This results in a considerable simplification of the machine and the tube is thus formed in one piece.

What we claim is:

1. A method for the manufacture, starting from a prefabricated tubular blank, of a collapsible tube of heat-softenable plastic material formed in one piece and comprising a tubular body and a head destined to receive a closing member, characterized in that the material of a part of the blank is softened by heating it in intimate contact with the wall of a chamber, said part of the blank when softened adhering to said chamber wall and owing to its adherence to this wall being maintained in its initial shape, and in that the softened material which thus adheres is mechanically, forcibly scraped off said wall and that the head of the tube is formed with said softened and scraped off material by cold die-moulding.

2. A method for the manufacture, starting from a prefabricated tubular blank in one single piece, of a collapsible tube of plastic material formed in one piece and comprising a tubular body and a head destined to receive a closing member, characterized in that the material of a part of the blank is softened by heating it in intimate contact with the wall of a chamber, said part of the blank when softened adhering to said chamber wall and owing to its adherence to this wall being maintained in its initial shape, and in that the softened material which thus adheres is mechanically, forcibly scraped off said wall and that the head of the tube is formed with said softened and scraped off material by cold die-moulding.

3. A method for the manufacture, starting from a prefabricated tubular blank in two parts, of a collapsible tube of plastic material formed in one piece and comprising a tubular body and a head destined to receive a closing member, characterized in that the material of a part of the blank is softened by heating it in intimate contact with the wall of a chamber, said part of the blank when softened adhering to said chamber wall and owing to its adherence to this wall being maintained in its initial shape, and in that the softened material which thus adheres is mechanically, forcibly scraped off said wall and that the head of the tube is formed with said softened and scraped off materials by cold die-moulding.

4. A machine for carrying out the method according to claim 1, comprising an unheated, cold core forming at one of its extremities a punch arranged to cooperate with a part of the tubular blank, an unheated, cold moulding die arranged to cooperate with the said extremity of the punch in order to form the head of the tube by die-moulding the material forming the blank, the punch and the die being capable of relative axial movement, and means constituting a chamber a wall of which closely surrounds the blank, at least during the die-moulding operation, characterized in that there are means for heating the wall of the above-mentioned chamber at least when it is in contact with the blank, in order to simultaneously soften the material of this blank and cause it to adhere to the said wall, and in that the unheated die is provided with a peripheric edge forming a cold scraper, in order to scrape off the softened material adhering to the said wall and bring it gradually to cover the extremity of the punch, in the course of the relative motion between the die and this wall, just before and during the die-moulding operation.

5. A machine according to claim 4, characterized by means including said core for maintaining part of the blank at a temperature which is less than the softening temperature of the plastic material forming this blank.

6. A machine according to claim 4, characterized in that the wall of the abovementioned chamber is formed of at least two parts capable of moving apart radially in relation to the axis of the chamber.

7. A machine according to claim 4, characterized in that the axis of the punch and that of the die coincide.

8. A machine according to claim 4, characterized in that the axis of the punch and that of the die coincide, and in that the said peripheric edge forming a scraper of the die is a sharp edge projecting obliquely and outwardly, at the extremity of the die facing the punch, and beyond the exterior profile of the body of this die.

9. A machine according to claim 4, characterized in that the axis of the punch and that of the die coincide, and in that the said peripheric edge forming a scraper of the die is a sharp edge projecting obliquely and outwardly, at the extremity of the die facing the punch, and beyond the exterior profile of the body of this die, the said peripheric edge being elastic.

References Cited in the file of this patent

UNITED STATES PATENTS

| 2,317,763 | Hall | Apr. 27, 1943 |
| 2,418,155 | Bogoslowsky | Apr. 1, 1947 |
| 2,788,544 | Voumard et al. | Apr. 16, 1957 |

FOREIGN PATENTS

| 1,138,584 | France | June 17, 1957 |